A. M. AHERN.
ANIMAL TRAP.
APPLICATION FILED JULY 10, 1916.
1,214,404. Patented Jan. 30, 1917.
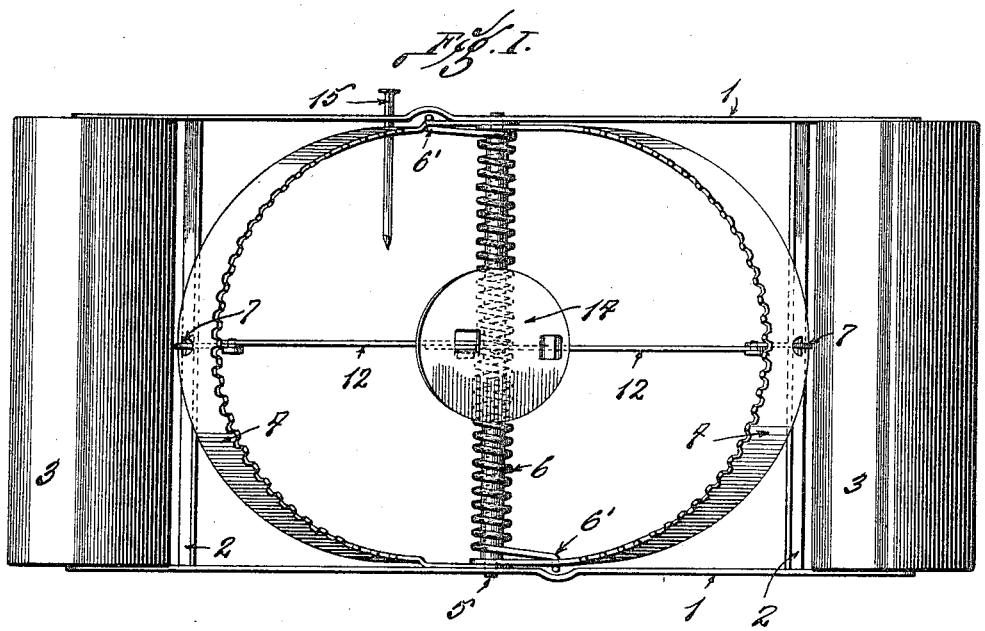
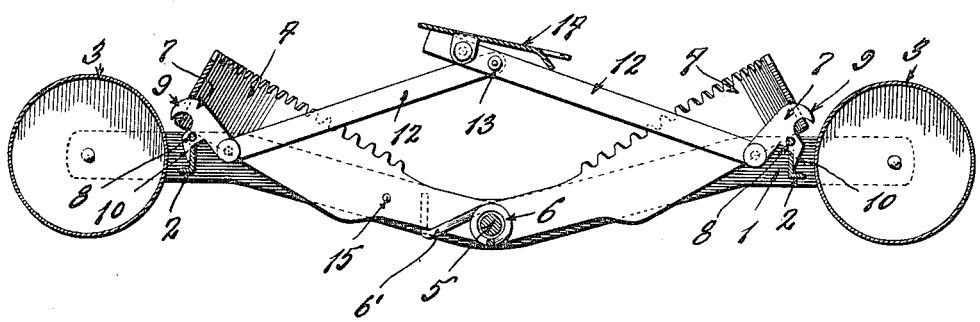

UNITED STATES PATENT OFFICE.

ALBERT M. AHERN, OF ST. LOUIS, MISSOURI.

ANIMAL-TRAP.

1,214,404. Specification of Letters Patent. Patented Jan. 30, 1917.

Application filed July 10, 1916. Serial No. 108,333.

*To all whom it may concern:*

Be it known that I, ALBERT M. AHERN, a citizen of the United States of America, a resident of the city of St. Louis, State of Missouri, have invented certain new and useful improvements in Animal-Traps, of which the following is a full, clear, and exact description, reference being had to the accompanying drawing, forming a part of this specification.

My invention relates to improvements in animal traps, one of the objects being to produce a simple and efficient trippable device for holding the jaws of a trap in their open positions.

Another object is to provide a strong and simple floating trap having gripping jaws and jaw holding devices that are free to move independently of the float which supports them.

A further object is to provide an inexpensive means for retaining one of the gripping jaws in its open position during the operation of opening and setting the other jaw.

Figure I is a plan view of an animal trap constructed in accordance with the invention. Fig. II is a longitudinal section taken approximately through the center of the trap.

The trap frame comprises side bars 1 connected to each other by a pair of L-shaped bars 2. A pair of float members 3, in the form of hollow metallic cylinders, are secured to the end portions of the side bars 1. 4 designates inverted U-shaped gripping jaws pivotally connected at their lower ends to a pivot rod 5 which extends across the trap frame, the ends of said pivot rod being secured to the side bars 1. A spring 6, surrounding the pivot rod, tends to force the gripping jaws toward each other. This spring is under tension and its end portions are bent to form hooks 6' which engage the gripping jaws.

7 designates retaining fingers adapted to hold the jaws in their open positions. Each retaining finger is pivoted, at 8, to the supporting frame and provided with an extension 9 adapted to pass through an opening in one of the jaws 4. Stop members 10, extending from the retaining fingers, are adapted to engage the bars 2 to limit the outward movements of said fingers. The tripping device is preferably a toggle having its ends pivotally connected to the lower ends of the retaining fingers 7. The links 12 which form this toggle are pivoted to each other at 13. The usual circular plate 14, located at the center of the trap, is secured to one of the toggle links 12. When the trap is set the toggle links 12 occupy the inclined positions shown in Fig. II, and the retaining fingers 7 are engaged with the spring actuated jaws to retain them in their open positions. The jaws tend to move toward each other, but movement of this kind is prevented by the retaining fingers 7. It will be noted that the outer portions of the jaws tend to move upwardly at the gripping fingers, and that the pivots 8 are so arranged that the gripping fingers will remain in engagement with the jaws until the middle portion of the toggle is depressed. When the toggle links 12 are forced downwardly from the position shown in Fig. II, the outer ends of the toggle will move away from each other with the result of withdrawing the retaining fingers 7 from the jaws 4, and allowing the spring 6 to force said jaws toward each other.

15 designates a jaw holding member, preferably a nail or other inexpensive device, adapted to be inserted through one of the side bars 1, and also through a portion of one of the gripping jaws 4 for the purpose of retaining said gripping jaw in its open position during the operation of setting the trap. The first step in setting the trap is to place the jaw holding member 15 in its operative position to fasten one of the gripping jaws in its open position. Thereafter the other gripping jaw is forced to its open position, and the trap may then be inverted to allow the toggle and retaining fingers to drop, by gravity, from their inoperative positions to their operative positions. It will be noted that the trippable jaw holding devices I have shown will readily drop to their operative positions when the trap is inverted. After the trap has been set in this manner, the temporary jaw holding member 15 may be permitted to drop therefrom by pushing the jaws toward the floats 3 so as to reduce or eliminate the friction between said member 15 and the other elements of the trap, at the same time turning the trap to a position wherein the member 15 will be free to drop by gravity from the trap.

It will now be understood that the trap I have shown may be very easily "set" and that the trippable jaw holding device constitutes a highly efficient means for retaining the spring actuated jaws in their open positions. It will also be observed that the jaws and tripping devices are free to move independently of the float frame, the latter being a strong and durable structure adapted to support the trap in a body of water.

I claim:—

1. An animal trap comprising a pair of gripping jaws, jaw retaining devices for holding the trap in its open condition, and a depressible tripping device comprising a toggle pivoted to said jaw retaining devices.

2. An animal trap comprising a pair of pivotally connected gripping jaws, a pair of pivotally supported jaw retaining members associated with said jaws to hold the latter in their open positions, and a depressible tripping device comprising a toggle the ends of which are pivoted to the pivotally supported jaw retaining members, said toggle being operable to release said jaw retaining members from said jaws.

3. An animal trap comprising a frame, a pair of gripping jaws pivoted to said frame, jaw restraining members pivoted to said frame at points to which said jaws are spread when the trap is opened, and a toggle connecting said jaw engaging members, said toggle being movable upwardly to interlock said restraining members with said jaws and downwardly to separate said parts.

ALBERT M. AHERN.

Copies of this patent may be obtained for five cents each, by addressing the "Commissioner of Patents, Washington, D. C."